US012216486B2

(12) United States Patent
Sirinamaratana et al.

(10) Patent No.: US 12,216,486 B2
(45) Date of Patent: Feb. 4, 2025

(54) VOLTAGE REGULATOR CIRCUIT FOR RFID CIRCUIT

(71) Applicant: SILICON CRAFT TECHNOLOGY PUBLIC COMPANY LIMITED (SICT), Bangkok (TH)

(72) Inventors: Pairote Sirinamaratana, Nonthaburi (TH); Pattrakorn Chokchalermwat, Nonthaburi (TH)

(73) Assignee: SILICON CRAFT TECHNOLOGY PUBLIC COMPANY LIMITED (SICT), Bangkok (TH)

( * ) Notice: Subject to any disclaimer, the term of this patent is extended or adjusted under 35 U.S.C. 154(b) by 28 days.

(21) Appl. No.: 18/269,921

(22) PCT Filed: Dec. 28, 2020

(86) PCT No.: PCT/IB2020/062466
§ 371 (c)(1),
(2) Date: Jun. 27, 2023

(87) PCT Pub. No.: WO2022/144566
PCT Pub. Date: Jul. 7, 2022

(65) Prior Publication Data
US 2024/0085933 A1 Mar. 14, 2024

(51) Int. Cl.
*G05F 1/56* (2006.01)
*G05F 3/26* (2006.01)
*G06K 19/07* (2006.01)

(52) U.S. Cl.
CPC ............... *G05F 1/56* (2013.01); *G05F 3/262* (2013.01); *G06K 19/0708* (2013.01)

(58) Field of Classification Search
None
See application file for complete search history.

(56) References Cited

U.S. PATENT DOCUMENTS 7,538,673 B2 5/2009 Balachandran et al.
9,240,690 B2 * 1/2016 Xue .......................... H02J 50/70
(Continued)

OTHER PUBLICATIONS

International Search Report and Written Opinion issued in PCT/IB2020/062466 dated May 24, 2021.
(Continued)

*Primary Examiner* — Thomas J. Hiltunen
(74) *Attorney, Agent, or Firm* — TROUTMAN PEPPER HAMILTON SANDERS LLP

(57) ABSTRACT

A voltage regulator circuit for RFID circuit utilizing a high efficiency circuit topology to minimize power consumption to provide only required current to regulate output voltage. The voltage regulator circuit does not consume quiescent current which minimizes power consumption. It does not contain inductor, transformer, op-amp, voltage and current reference which reduces complexity and die area. The voltage regulator circuit comprises a driving element, a control circuit and a sensing circuit. The driving element drives controlled current to output to ramp up the voltage. The sensing circuit measures voltage at the output and sends signal to the control circuit if the voltage reaches target value set by the internal parameters of the components. The control circuit stops the driving element when output voltage reaches the threshold minimizing current required to regulate voltage.

27 Claims, 5 Drawing Sheets

(56) References Cited

U.S. PATENT DOCUMENTS

| | | |
|---|---|---|
| 10,043,124 B2 | 8/2018 | Buescher |
| 10,243,554 B2 * | 3/2019 | Rachupalli ......... G06K 19/0723 |
| 10,312,743 B2 * | 6/2019 | Ouda ...................... H02M 7/02 |
| 10,651,763 B2 * | 5/2020 | Lin ........................ H02J 50/20 |
| 10,690,703 B2 * | 6/2020 | Choi ....................... H02J 50/10 |
| 11,313,742 B2 * | 4/2022 | Puget ..................... G01C 19/00 |
| 2006/0261796 A1 | 11/2006 | Park et al. |
| 2007/0046474 A1 | 3/2007 | Balachandran et al. |
| 2009/0058601 A1 | 3/2009 | Balachandran et al. |
| 2013/0335056 A1 | 12/2013 | Inoue et al. |
| 2018/0174010 A1 | 6/2018 | Buescher |
| 2021/0391804 A1 * | 12/2021 | Salama .................. H02M 1/08 |

OTHER PUBLICATIONS

Rahman et al. "Design of High Speed and Low Offset Dynamic Latch Comparator in 0.18 μm CMOS Process." PLOS One. vol. 9; Issue 10. (Oct. 1, 2014).

* cited by examiner

VOLTAGE REGULATOR CIRCUIT FOR RFID CIRCUIT

This application is a U.S. national stage application of International Application No. PCT/IB2020/062466, filed on Dec. 28, 2020, the entire contents of which application is hereby incorporated by reference in its entirety.

TECHNICAL FIELD OF THE INVENTION

This invention relates to voltage regulator circuit for RFID circuit and more specifically power-efficient voltage regulator circuit.

BACKGROUND OF THE INVENTION

Radio Frequency Identification (RFID) systems utilize "tags" which are attached to an object to be tracked and have been used in automated pay systems and the tracking of animals or goods in inventory or in transit.

For passive RFID tags, a front-end circuit, such as rectifier and regulator etc., is utilized to extract energy from an incoming RF signal and provide power for the processor circuits inside the RFID chip. Since the power in the RF signal that can be extracted is inversely proportional to the reading distant, the maximum reading distant of the RFID tags is limited by the power consumption of the RFID circuits.

To reduce power consumption of the circuits without affecting the processor of the RFID tags, one can reduce the power consumption of the front-end circuit such as a regulator circuit.

Document U.S. Pat. No. 7,538,673 B2 describes a voltage regulator circuit based on low drop oscillators (LDO). The LDO approach has an advantage of having no inductor or transformer which would be impossible to implement in RFID tags, however, it has many parts that consume quiescent current resulting in higher power consumption. Also, the circuit has many active circuits, such as op-amp and current reference, that adds complexity and die area.

Document U.S. Pat. No. 10,043,124 B2 describes a voltage regulator circuit based on switching regulator without inductor or transformer. This invention contains static comparator which consumes quiescent current. The circuit can be designed to consume very low current by using very large resistor, but the size would be impractical for the regulator inside RFID chip. Also, the output voltage level is set by input voltage level which is achieved by using shunt limiter to shunt excess power to ground. Therefore, if the target output voltage is low, the more power is wasted.

In view of the above, there is a need to provide an improved regulator for RFID tags that does not consume quiescent current to reduce power consumption, and does not contain op-amp, voltage or current reference to reduce complexity and die area.

SUMMARY OF THE INVENTION

The present invention relates to a voltage regulator circuit for RFID circuit comprising:
 first and second input nodes connected to outputs of a rectifier circuit which generate half wave rectified voltage signals from an electromagnetic wave signal received by the RFID circuit;
 an output node connected to RFID circuit;
 a control circuit connected to the first and second input nodes, a control node and a sensing node, wherein the control circuit is able to control the control node when triggered by the sensing node, the control circuit comprises
  first and second transistors of cross-coupled pair formed the cross-coupled pair configuration,
  an impulse current source connected to the first and second transistors of cross-coupled pair, a first switch connected to the first and second transistors of cross-coupled pair,
  a second switch connected to the first and second transistors of cross-coupled pair, and
  a third switch connected to the first and second transistors of cross-coupled pair;
 a driving element coupled between the first input node and the output node and driven by the control node, wherein the driving element comprises
  a driving transistor connected to the first input node and the control node to drive the current from the first input node to the output node when driven by the control node, and
  a blocking diode coupled between the driving transistor and the output node to block the current from flowing back to the first input node; and
 a sensing circuit connected to the output node, wherein the sensing circuit is capable of sensing an output voltage and signaling the other circuit when sensed voltage reaches a target value, the sensing circuit comprises
  an output voltage adjusting component,
  a fourth switch connecting the sensing node and the output voltage adjusting component, and
  a fifth switch connecting the sensing node to ground.

According to the present invention, the voltage regulator circuit for RFID circuit further comprising an output capacitor connecting the output node to ground.

According to the present invention, the first switch and third switch connected with the first and second transistors of cross-coupled pair via latch node.

According to the present invention, the second switch connected with the first and second transistors of cross-coupled pair via the control node.

According to the present invention, the impulse current source connected between the first input node and the first transistor of cross-coupled pair.

According to the present invention, the first switch is configured to connect between the latch node and ground.

According to the present invention, the second switch is configured to connect between the control node and ground.

According to the present invention, the third switch is configured to connect either between the latch node and the first input node or between the latch node and ground.

According to the present invention, the first switch is transistor driven by the sensing node.

According to the present invention, the second and third switches are transistors driven by a second holding node, controlled by switch controller.

According to the present invention, the switch controller comprises first, second, third and fourth transistors of switch controller which first and second transistors of the switch controller are connected in diode-connected configuration.

According to the present invention, the transistor of switch controller is configured to connect the first input node to first holding node.

According to the present invention, the second transistor of switch controller is configured to connect the second input node to the second holding node.

According to the present invention, the third transistor of switch controller is connected to the first holding node to ground driven by the second input node.

According to the present invention, the fourth transistor of switch controller is configured to the second holding node to ground driven by the first holding node.

According to the present invention, the first and second transistors of switch controller connecting each input node to the third switch and the second switch.

According to the present invention, the first and second transistors of switch controller could be replaced with diode.

According to the present invention, the impulse current source in the control circuit comprises a current mirror having a first mirror transistor and a second mirror transistor, wherein source terminals of the first mirror transistor and the second mirror transistor connecting together with the first input node, and gates of the first mirror transistor and the second mirror transistor connecting together with the mirror node, and a current source resetting transistor coupled the mirror node to ground.

According to the present invention, the mirror node is coupled to ground via the current source resetting transistor.

According to the present invention, the current source resetting transistor is driven by the second input node.

According to the present invention, drain of the first mirror transistor is connected to the mirror node.

According to the present invention, the voltage regulator circuit for an RFID circuit further comprising a capacitor connecting the mirror node to ground.

According to the present invention, blocking diode could be replaced with a diode-connected transistor.

According to the present invention, the output voltage adjusting component is either diode, diode-connected transistor, stacks of diodes, diode-connected transistor, resistor, or any combination thereof.

According to the present invention, the target value could be internally adjusted.

According to the present invention, the fourth switch is a transistor driven by one of the input nodes.

According to the present invention, the fifth switch is a transistor driven by the other one of the input nodes.

The general purpose of this invention is to provide a power-efficient voltage regulator circuit for RFID tags which minimizes power dissipation in the voltage regulator circuit and maximizes reading range of the RFID tags. The voltage regulator circuit possesses most, if not all, of the advantages of related prior art voltage regulators while possessing none of their significant disadvantages. To attain this purpose, the developed voltage regulator circuit in which voltage regulation is achieved by utilizing a driving element with a control circuit and a sensing circuit. The driving element drives controlled current to output to ramp up the voltage. The sensing circuit measures voltage at output and sends signal to the control circuit if voltage reaches target value which is set by internal parameters of the components. The control circuit stops the driving element when output voltage reaches the target value minimizing current required to regulate voltage. Furthermore, the voltage regulator circuit does not contain any quiescence current branch which further improves the power efficiency of the voltage regulator circuit.

Another purpose of this invention is to provide a voltage regulator circuit of the type described which does not requires coupling transformers or inductors, and which may easily be constructed utilizing a relatively small area on RFID tags.

Another purpose of this invention is to provide a voltage regulator circuit of the type described which does not requires any additional voltage or current references, and which may easily be constructed utilizing a relatively small area on RFID tags.

These purposes are achieved in accordance with the circuit features which have been briefly summarized above and which will be described in further detail with reference to the accompanying drawings.

DETAILED DESCRIPTION

Figure 1:
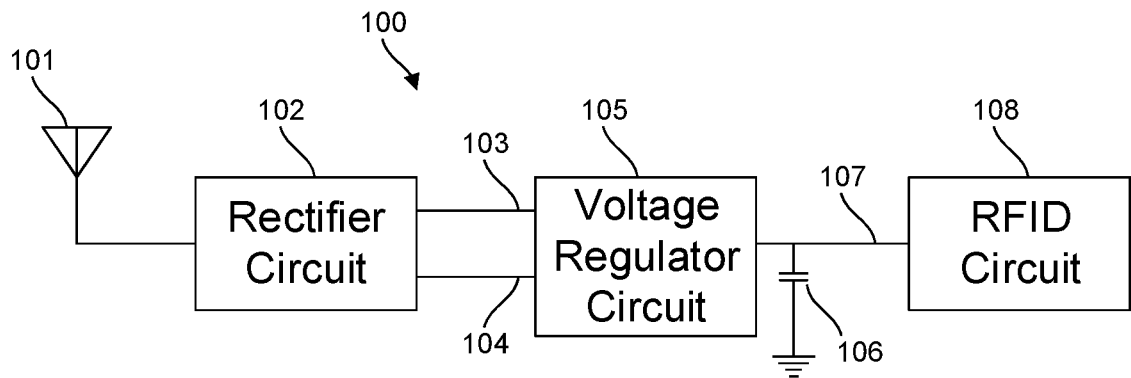
FIG. 1. is a functional block diagram of RFID tags

FIG. 1 shows a functional block diagram of RFID tags 100. In FIG. 1, the RF signal is received by an antenna 101. Then, the rectifier circuit 102 rectifies the signal into two half-wave rectified signals with phase difference about 180 degrees, at the first input node 103 and second input node 104. These signals are then fed into the voltage regulator circuit 105 which supplies the output capacitor 106 and provides a regulated voltage at output node 107. The regulated voltage at the output node 107, which stays around the predetermined value, called "target value", with the ripple size below 10%, is used to provide power for RFID circuit 108.

Figure 2:
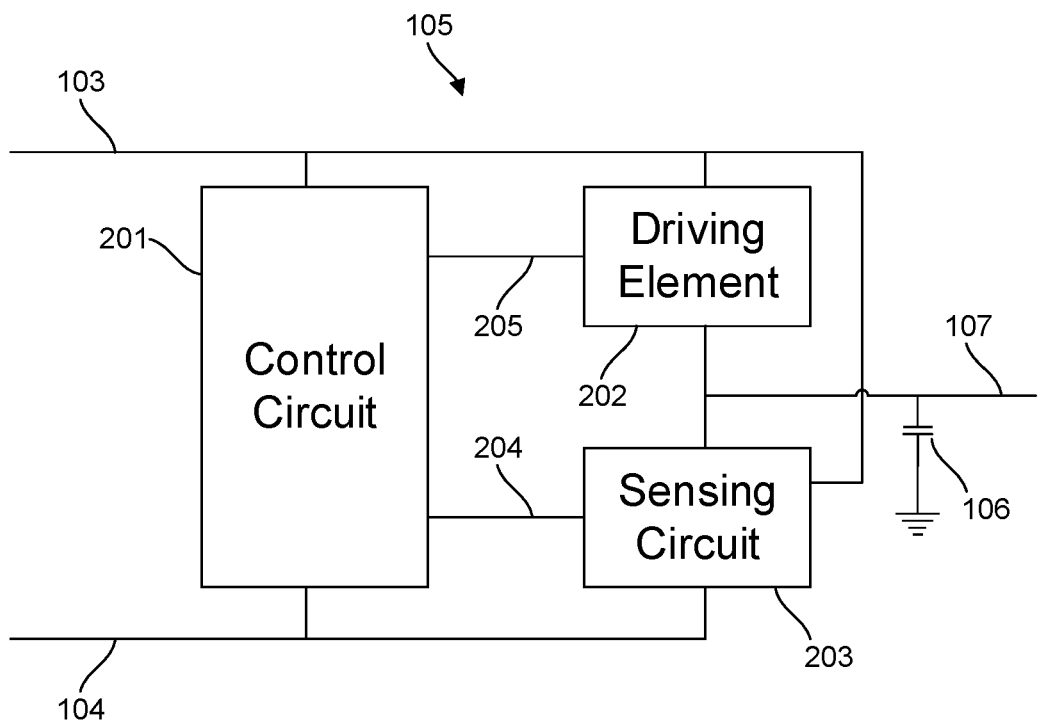
FIG. 2 is a schematic architecture of a voltage regulator circuit according to the present invention.

FIG. 2 shows a schematic architecture of a voltage regulator circuit 105 according to the present invention. The voltage regulator circuit 105 has two inputs connected to the first and second input nodes 103 and 104 and has one output connected to the output node 107. The voltage regulator circuit 105 comprises control circuit 201, driving element 202, and sensing circuit 203. The control circuit 201 is connected to the sensing circuit 203 by the sensing node 204 and is connected to the driving element 202 by the control node 205. The driving element 202 is also connected to the sensing circuit 203 by the output node 107.

The voltage regulator circuit 105 operates in a cycle which can be divided into two phases i.e. driving phase where the voltage at first input node 103 is more than 0 volt but the voltage at second input node 104 is approximately 0 volt, and reset phase where the voltage at second input node 104 is more than 0 volt but the voltage at first input node 103 is approximately 0 volt. In the driving phase, the control circuit 201 controls the driving element 202 via the control node 205 to drive current from the first input node 103 to output node 107 through the driving element 202, resulting in rising of the voltage at the output node 107. When the voltage at the output node 107 reaches the "target value", the sensing circuit 203 will send a signal to the control circuit 201 via the sensing node 204. Then, the control circuit 201 will stop the driving element 202 from driving current to the output node 107, resulting in stopping voltage at the output node 107 to rise too far beyond the "target value" (typically not over 5% of the target value). In the reset phase, the voltage regulator circuit 105 is reset back to the initial state before starting the driving phase and be ready for the next driving phase. As a result, the voltage at the output node 107 will be regulated and stay around the "target value".

The size of the output capacitor 106 can be adjusted to control the ripple size of the output voltage at the output node 107.

Figure 3:
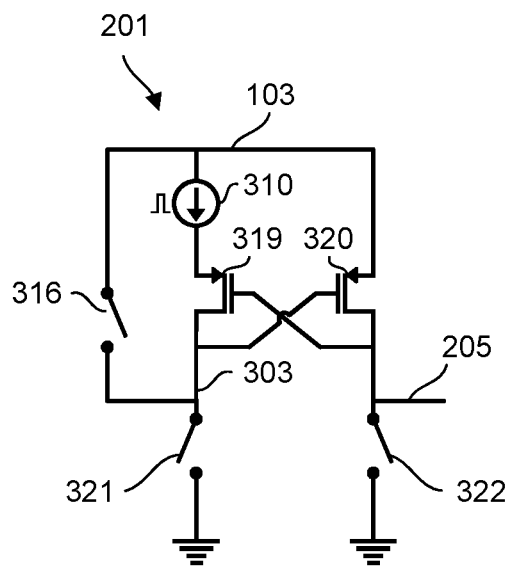
FIG. 3 is a control circuit of the voltage regulator circuit according to the present invention.

FIG. 3 shows a control circuit 201 of the voltage regulator circuit according to the present invention. The control circuit 201 comprises first transistor of cross-coupled pair 319 and second transistor of cross-coupled pair 320 forming the cross-coupled pair configuration, an impulse current source 310, a first switch 321, a second switch 322, and a third switch 316. The first transistor of cross-coupled pair 319 and the second transistor of cross-coupled pair 320 are connected to the first switch 321 and the third switch 316 via the latch node 303, and to the second switch 322 via the control node 205. The impulse current source 310 is connected between the first input node 103 and the first transistor of cross-coupled pair 319. The first switch 321 is connected between the node 303 and ground. The second switch 322 is connected between the control node 205 and ground. The third switch 316 is connected between the latch node 303 and the first input node 103.

The operation of the control circuit 201 is initially at the start of the driving phase. All three switches 321, 322, 316 are off, and the impulse current source 310 supplies current for a short amount of time from the first input node 103 through the first transistor of cross-coupled pair 319 into the latch node 303 causing the voltage at the latch node 303 to be higher than the voltage at the control node 205. The amount of time to supply the current must be minimized to reduce the power consumption. After the first input node 103 is risen enough, the first transistor of cross-coupled pair 319 will turn on before the opening of the second transistor of cross-coupled pair 320 causing the first and second transistors of cross-coupled pair 319 and 320 to latch with the latch node 303 as high and the control node 205 as ground. If the first switch 321 is turned on during the driving phase, the voltage at the latch node 303 will be pulled to ground which, in turn, triggers the first and second transistors of cross-coupled pair 319 and 320 and pulls up the voltage at the control node 205 equal to the voltage at the first input node 103.

As would be well understood by the person skilled in the art, a switch could be implemented with a transistor or combination of transistors. The first switch 321, for example, can be implemented with a transistor driven by the sensing node 204 to trigger the operation of the control circuit 201.

The voltage at the control node 205 can be used to control the driving element 202 directly; by connecting the control node 205 to the driving element 202, or indirectly by putting a buffer or inverter in between the control node 205 and the driving element 202, for example.

For the reset phase, the first switch 321 must be turned off, and the second switch 322 and third switch 316 must be turned on to reset the latch node 303 and the control node 205, keeping the voltage of both nodes at ground.

In another embodiment, the third switch 316 can be connected between the latch node 303 and ground instead of the first input node 103 and the latch node 303.

Figure 4:
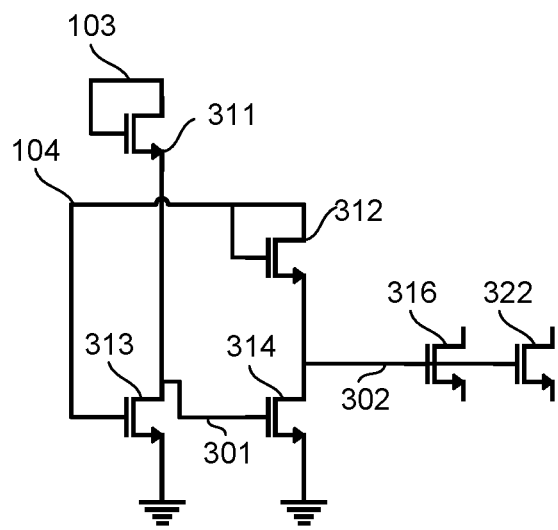
FIG. 4 is an example circuit implementation of the switches and the switch controller in the control circuit of the voltage regulator circuit according to the present invention.

FIG. 4 is an example circuit implementation of the switches i.e. the third switch 316 and the second switch 322, and switch controller in the control circuit 201 of the voltage regulator circuit according to the present invention. The second and third switches 316, 322, for example, could be implemented with a transistor commonly driven by the second holding node 302. The second holding node 302 is controlled by the switch controller to keep the third switch 316 and second switch 322 off during the driving phase, and on during the reset phase.

The switch controller comprises first, second, third and fourth transistors of switch controller 311, 312, 313 and 314, which the first and second transistors of switch controller 311, 312 are connected in diode-connected configuration. The first transistor of switch controller 311 connects the first input node 103 to first holding node 301. The second transistor of switch controller 312 connects the second input node 104 to second holding node 302. The third transistor of switch controller 313 connects the first holding node 301 to ground driven by the second input node 104. The fourth transistor of switch controller 314 connects the second holding node 302 to ground driven by the first holding node 301.

In the driving phase, the voltage at the first input node 103 turns on the first transistor of switch controller 311, while the second input node 104 keeps the second and third transistors of switch controller 312, 313 off, which makes the voltage at the first holding node 301 equal to the voltage at the first input node 103 minus an internal threshold voltage of the first transistor of switch controller 311, which, in turn, turns on the fourth transistor of switch controller 314 and keeps the voltage at the second holding node 302 at approximately 0 volt, keeping the third switch 316 and second switch 322 off. While the first input node 103 is falling, the voltage at the first holding node 301 will stay at the maximum value, causing the first transistor of switch controller 311 to block the reverse current, to ensure that the third switch 316 and second switch 322 are off throughout the driving phase.

In the reset phase, the voltage at the first input node 103 is approximately 0 volt keeping the first transistor of switch controller 311 off. The voltage at the second input node 104 turns on the second and third transistors of switch controller 312, 313 pulling the voltage at the first holding node 301 down to 0 volt, which, in turn, turns off the fourth transistor of switch controller 314. This makes the voltage at the second holding node 302 equal to the voltage at the second input node 104 minus an internal threshold, which eventually turns on the third switch 316 and second switch 322. While the second input node 104 is falling, the voltage at the second holding node 302 will stay at maximum value to ensure that the third switch 316 and second switch 322 are on throughout the reset phase.

In another embodiment, the first and second transistors of switch controller 311 and 312, which are connected in diode-connected configuration, could be replaced with diode.

Figure 5:
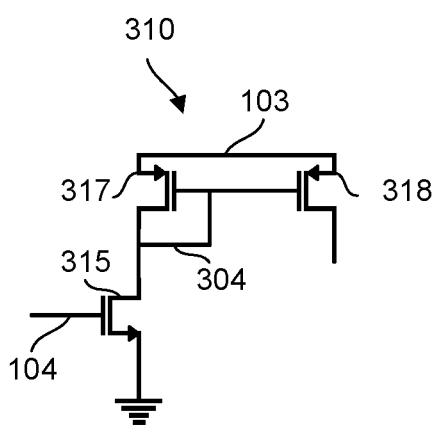
FIG. 5 is an example circuit implementation of an impulse current source in the control circuit of the voltage regulator circuit according to the present invention.

FIG. 5 is an example circuit implementation of an impulse current source 310 in the control circuit 201 of the voltage regulator circuit according to the present invention. The impulse current source 310 comprises a current source resetting transistor 315 driven by the second input node 104, and a current mirror having a first mirror transistor 317 and a second mirror transistor 318. The first mirror transistor 317 and second mirror transistor 318 have their source terminal connected to the first input node 103 and the gate connected to the mirror node 304. The drain of the first mirror transistor 317 is connected to the mirror node 304. The mirror node 304 is coupled to ground via the current source resetting transistor 315. The main current path of the impulse current source 310 is the path through the second mirror transistor 318 from the first input node 103 to the node at another terminal which is connected to other node in the circuit.

The operation of the impulse current source 310 is divided into two phases including driving phase and reset phase. In the driving phase, when the first input node 103 is rising, the first mirror transistor 317 is turned on and current starts to flow through from the first input node 103 into the mirror node 304. Due to the parasitic capacitance at the mirror node 304, the voltage at the mirror node 304 will be rising with a delay comparing to the first input node 103 resulting in larger difference of voltage between the mirror node 304 and the first input node 103. However, the voltage at the first input node 103 will rise at a slower rate which allows the voltage at the mirror node 304 to keep up and then resulting in smaller voltage difference between the mirror node 304 and the first input node 103. During this time, the second mirror transistor 318 is also turned on and off, depending on the size of voltage difference, supplying current for a short amount of time. The amount of time relating to the amount of supplied current while the second mirror transistor 318 is on can be adjusted by increasing threshold voltage of the second mirror transistor 318 or decreasing threshold voltage of the first mirror transistor 317. The amount of supplied current can also be adjusted by adding a capacitor coupled with the mirror node 304 to ground or adjusting the parasitic capacitance at the mirror node 304. In another aspect of the invention, the mirror node 304 is also connected to the ground via the current source resetting transistor 315. The current source resetting transistor 315 is driven by the second input node 104 to reset the circuit in the reset phase where the voltage at the second input node 104 is rising.

Figure 6:
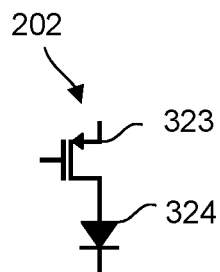
FIG. 6 is an example circuit implementation of a driving element of the voltage regulator circuit according to the present invention.

FIG. 6 is an example circuit implementation of the driving element 202 of the voltage regulator circuit according to the present invention. The driving element 202 comprises a driving transistor 323 connected in series with a blocking diode 324. The driving transistor 323 is used for driving the current from one terminal to another, and the blocking diode 324 is used for blocking the reversing current flow.

In another embodiment, the blocking diode 324 could be replaced with a diode-connected transistor.

Figure 7:
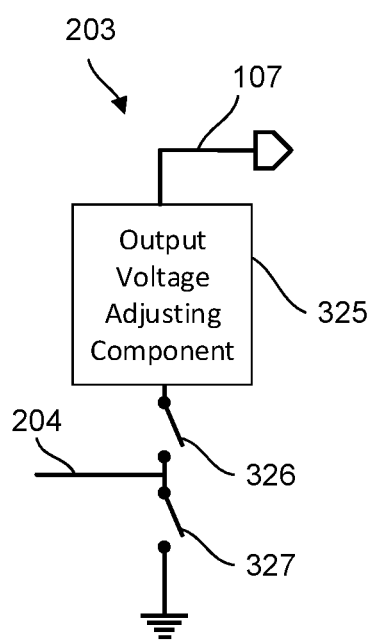
FIG. 7 is a sensing circuit of the voltage regulator circuit according to the present invention.

FIG. 7 is a sensing circuit 203 of the voltage regulator circuit according to the present invention. The sensing circuit 203 comprises two switches i.e. a fourth switch 326 and a fifth switch 327, and an output voltage adjusting component 325. The fourth switch 326 connects the sensing node 204 and the output voltage adjusting component 325. The fifth switch 327 connects the sensing node 204 to ground. The operation of the sensing circuit 203 is divided into two phases including driving phase and reset phase.

In the driving phase, the fourth switch 326 must be turned on and the fifth switch 327 must be turned off to connect the sensing node 204 to the output node 107 with the output voltage adjusting component 325. This results in the voltage at the sensing node 204 to become equal to the voltage at the output node 107 minus the voltage across the output voltage adjusting component 325 if the voltage at the output node 107 is larger than the voltage across the output voltage adjusting component 325, or else the voltage at the sensing node 204 will stay approximately equal to 0 volt. When the voltage at the sensing node 204 reaches a certain voltage, it will serve as a signal to trigger the control circuit 201 to stop the driving element 202.

Thus, the target value is equal to the summation of the voltage across the output voltage adjusting component 325 and the trigger voltage of the control circuit 201.

The voltage across the output voltage adjusting component 325 can be used for setting the target value of the regulated voltage at the output node 107.

The output voltage adjusting component 325 could be implemented with any components that could generate the voltage across the components such as a diode, a diode-connected transistor, a transistor, a resistor, stacks of diodes or any combination thereof. Using the internal parameters of the components to set the target value eliminates the need for external reference circuits and reduces the complexity, die area, and power consumption.

In the reset phase, the fourth switch 326 must be turned off to cut the current path from the output node 107 to the sensing node 204, and the fifth switch 327 must be turned on to reset the sensing node 204 to ground.

Figure 8:
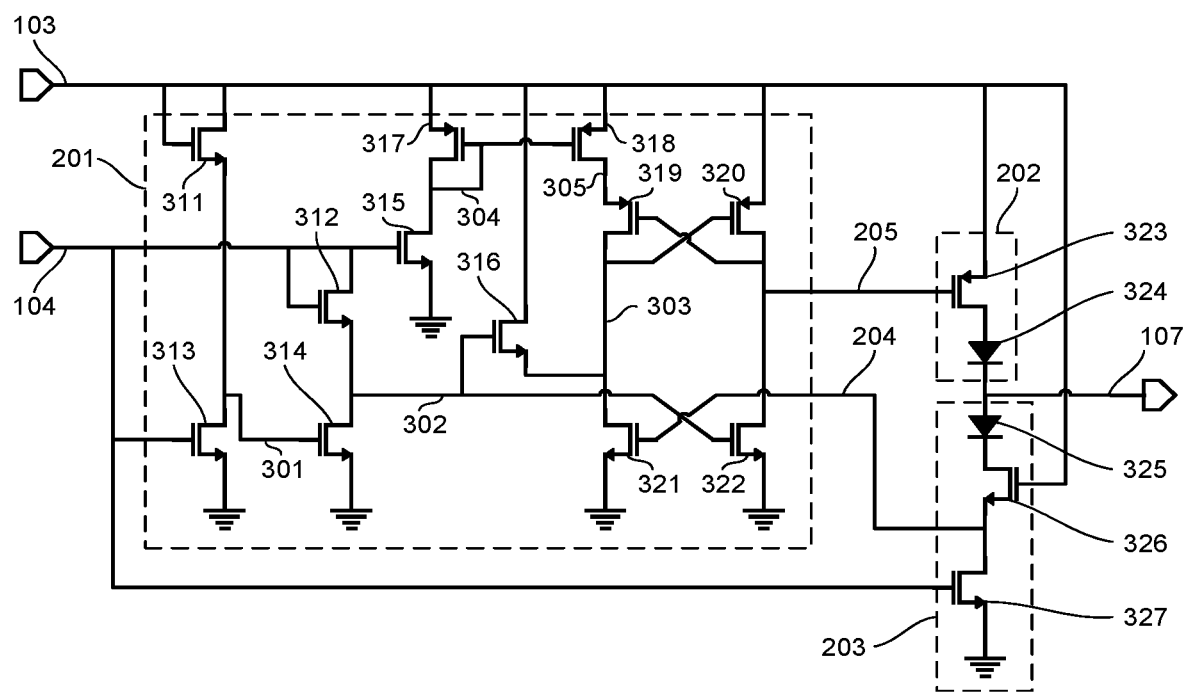
FIG. 8 is an example embodiment of the voltage regulator circuit of the present invention.

FIG. 8 shows an example embodiment of the voltage regulator circuit of the present invention, with various stages therein corresponding to the functional stages in FIG. 2. The first switch 321, for example, is implemented with a transistor driven by the sensing node 204. The second switch 322 and the third switch 316, for example, are implemented with the circuit in FIG. 4. The driving element 202 is implemented with the circuit in FIG. 6, in which the driving transistor 323 is connected to the first input node 103 and directly driven by the control node 205, and the blocking diode 324 is connected to the output node 107. In the sensing circuit 203, the fourth switch 326, for example, is implemented with a transistor driven by the first input node 103, the fifth switch 327, for example, is implemented with a transistor driven by the second input node 104, and the output voltage adjusting component 325 is implemented with a diode resulting in the target value equal to the summation of the internal threshold voltage of the output voltage adjusting component 325 and the first switch 321.

Figure 9:
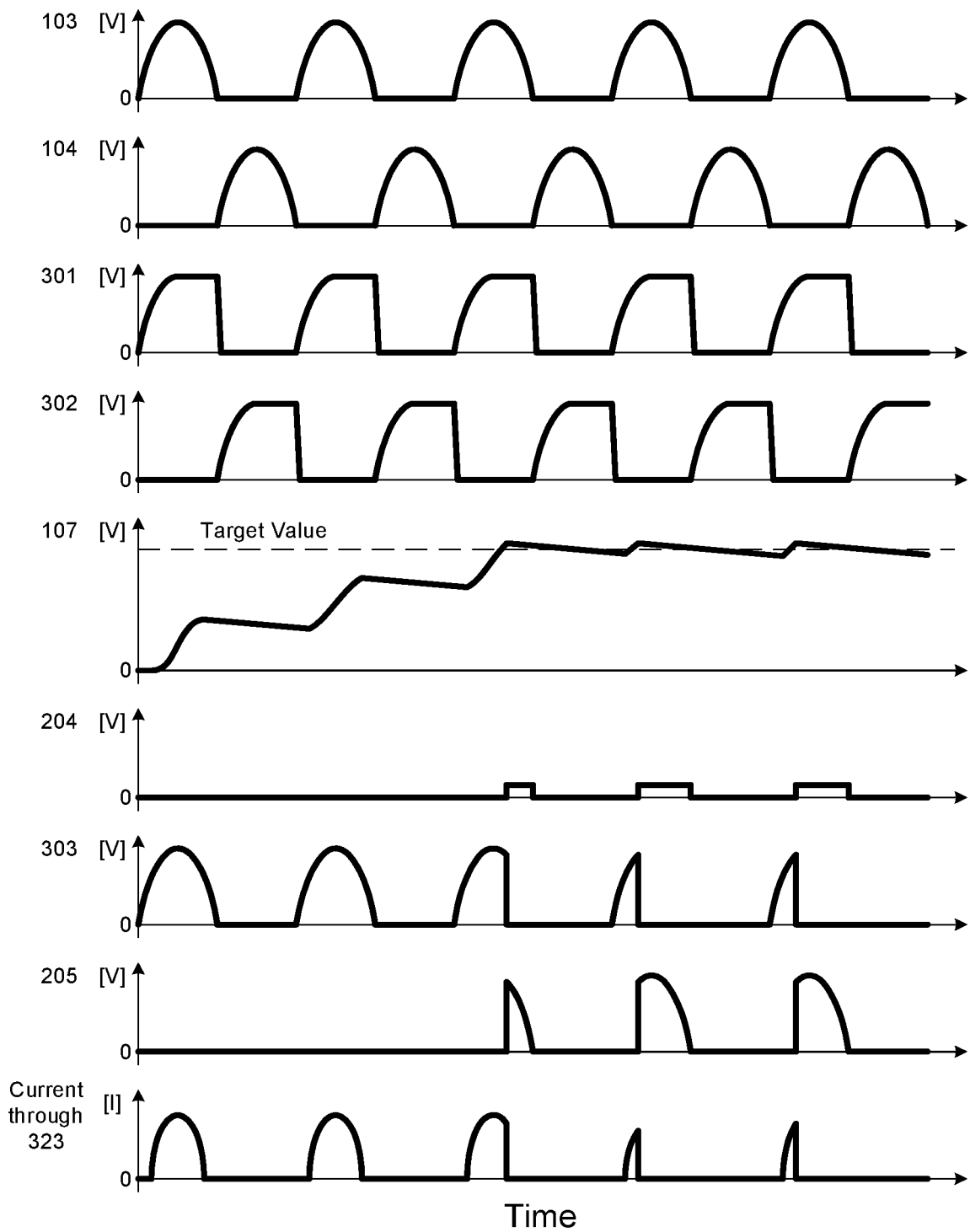
FIG. 9 illustrates a graph of the voltage and current waveforms as they appear at various circuit points referenced in FIG. 8.

FIG. 9 illustrates a graph of the voltage and current waveforms as they appear at various circuit points referenced in FIG. 8.

In the driving phase, the voltage regulator circuit 105 operates as follows.

Firstly, the voltage at the first input node 103 continuously rises causing the first transistor of switch controller 311 to turn on, while the second input node 104 stays at approximate 0 volt, keeping the first and second transistors of switch controller 312 and 313, and the current source resetting transistor 315 off, which makes the voltage at the first holding node 301 equal to the voltage at the first input node 103 minus an internal threshold voltage of the first transistor of switch controller 311, which, in turn, turns on the fourth transistor of switch controller 314 and pulls the voltage at the second holding node 302 to ground keeping the third switch 316 and second switch 322 off. While the first input node 103 is falling, the voltage at the first holding node 301 will stay at the maximum value, causing the first transistor of switch controller 311 to block the reverse current to ensure that the third switch 316 and second switch 322 are off throughout the driving phase.

While the voltage at the output node 107 does not reach the target value, as depicted in the first two cycles of the waveforms in FIG. 9, the voltage at the sensing node 204 stays approximately 0 volt which keeps the first switch 321 off.

The input node 103 also turns on the first mirror transistor 317 while the second input node 104 keeps the current source resetting transistor 315 off, which, in turn, turns on the second mirror transistor 318 and then supplies some current through the first transistor of cross-coupled pair 319 into the latch node 303. Since the first and second transistors of cross-coupled pair 319 and 320 are a cross-coupled pair, the current supplied through the first transistor of cross-coupled pair 319 will latch the cross-coupled pair keeping the voltage at the latch node 303 equal to the first input node 103 while the voltage at the control node 205 is still at approximately 0 volt in the meantime. This eventually turns on the driving transistor 323 resulting in current flow through the driving transistor 323 from the first input node 103 to the output node 107 ramping up the voltage at the output node 107.

When the voltage at the output node 107 ramps up beyond the target value during the driving phase, as depicted in the third, fourth, and fifth cycles of the waveforms in FIG. 9, the voltage at the sensing node 204 will also ramp up and turn the first switch 321 on which in turn pull the voltage at the latch node 303 down to the ground, triggering the first and second transistors of cross-coupled pair 319 and 320 to pull the control node 205 up, turn off and stop the current that flows through the driving transistor 323, and stop ramping up the voltage at the output node 107. As a result, the voltage at the output node 107 will be regulated and stay around the "target value".

Noted that the waveforms shown in FIG. 9 is an example; meaning, the operation of the voltage regulator circuit 105 could use more or less than three cycles for the voltage at the output node 107 to reach the target value. This depends on many factors such as the level of the target value, the capacitance of the output capacitor 106, the current consumption of the RFID circuit 108, the amplitude of the half-wave rectified signal at the first input node 103, and etc.

In the reset phase, the voltage regulator circuit 105 operates as follows.

The voltage at the first input node 103 stays approximately 0 volt keeping the first transistor of switch controller 311 off. The voltage at the second input node 104 begins rising and turns on the second and third transistors of switch controller 312 and 313 pulling the voltage at the first holding node 301 down to 0 volt, which, in turn, turns the fourth transistor of switch controller 314 off and makes the voltage at the second holding node 302 equal to the voltage at the second input node 104 minus an internal threshold voltage of the second transistor of switch controller 312, thus, turns on the third switch 316 and second switch 322. While the second input node 104 is falling, the voltage at the second holding node 302 will hold its maximum value to keep the third switch 316 and second switch 322 on throughout the reset phase.

The third switch 316 keeps the voltage at the first input node 103 equal to the latch node 303 to turn off the second transistor of cross-coupled pair 320 and let the second switch 322 reset the voltage at the control node 205 to ground which, in turn, resets the injecting node 305 to ground. The second input node 104 also turns on the current source resetting transistor 315 resetting the voltage at the mirror node 304 to ground. The blocking diode 324 blocks the current from flowing back from the output node 107 to the first input node 103. The first input node 103 turns off the fourth switch 326 blocking the current flow from the output node 107 to the sensing node 204. The second input node 104 also turns on the fifth switch 327 resetting the voltage at the sensing node 204 to the ground. The circuit is then completely reset and ready to operate in the driving phase again.

The operation of the voltage regulator circuit according to the present invention does not require any branch with quiescent current, but only requires a small amount of current as necessary to operate; e.g. only a small amount of the voltage at the sensing node 204 is required to turn on the first switch 321, thus minimizes power consumption.

What is claimed is:

1. A voltage regulator circuit for an RFID circuit comprising:
    first and second input nodes connected to outputs of a rectifier circuit which generate half wave rectified voltage signals from an electromagnetic wave signal received by the RFID circuit;
    an output node connected to RFID circuit;
    a control circuit connected to the first and second input nodes, a control node and a sensing node, wherein the control circuit is able to control the control node when triggered by the sensing node, the control circuit comprises first and second transistors of cross-coupled pair forming the cross-coupled pair configuration,
        an impulse current source connected to the first and second transistors of cross-coupled pair,
        a first switch connected to the first and second transistors of cross-coupled pair,
        a second switch connected to the first and second transistors of cross-coupled pair, and
        a third switch connected to the first and second transistors of cross-coupled pair;
    a driving element coupled between the first input node and the output node and driven by the control node, wherein the driving element comprises
        a driving transistor connected to the first input node and the control node to drive the current from the first input node to the output node when driven by the control node, and
        a blocking diode coupled between the driving transistor and the output node to block the current from flowing back to the first input node; and
    a sensing circuit connected to the output node, wherein the sensing circuit is capable of sensing an output voltage and signaling the control circuit when sensed voltage reaches a target value, the sensing circuit comprises an output voltage adjusting component,
        a fourth switch connecting the sensing node and the output voltage adjusting component, and
        a fifth switch connecting the sensing node to ground.

2. The voltage regulator circuit for an RFID circuit of claim 1 further comprising an output capacitor connecting the output node to ground.

3. The voltage regulator circuit for an RFID circuit of claim 1 wherein the first switch and the third switch are connected with the first and second transistors of cross-coupled pair via latch node.

4. The voltage regulator circuit for an RFID circuit of claim 1 wherein the second switch is connected with the first and second transistors of cross-coupled pair via the control node.

5. The voltage regulator circuit for an RFID circuit of claim 1 wherein the impulse current source is connected between the first input node and the first transistor of cross-coupled pair.

6. The voltage regulator circuit for an RFID circuit of claim 1 wherein the first switch is configured to connect between the latch node and ground.

7. The voltage regulator circuit for an RFID circuit of claim 1 wherein the second switch is configured to connect between the control node and ground.

8. The voltage regulator circuit for an RFID circuit of claim 1 wherein the third switch is configured to connect either between the latch node and the first input node or between the latch node and ground.

9. The voltage regulator circuit for an RFID circuit of claim 1 wherein the first switch is transistor driven by the sensing node.

10. The voltage regulator circuit for an RFID circuit of claim 1 wherein the second and third switches are transistors driven by a second holding node, controlled by switch controller.

11. The voltage regulator circuit for an RFID circuit of claim 10 wherein the switch controller comprises first, second, third and fourth transistors of switch controller which the first and second transistors of switch controller are connected in diode-connected configuration.

12. The regulator circuit for an RFID circuit of claim 11 wherein the first transistor of switch controller is configured to connect the first input node to first holding node.

13. The regulator circuit for an RFID circuit of claim 11 wherein the second transistor of switch controller is configured to connect the second input node to the second holding node.

14. The regulator circuit for an RFID circuit of claim 11 wherein the third transistor of switch controller is connected to the first holding node to ground driven by the second input node.

15. The regulator circuit for an RFID circuit of claim 11 wherein the fourth transistor of switch controller is configured to connect the second holding node to ground driven by the first holding node.

16. The voltage regulator circuit for an RFID circuit of claim 11 wherein the first and second transistors of switch controller connecting each input node to the third switch and the second switch.

17. The voltage regulator circuit for an RFID circuit of claim 11 wherein the first and second transistors of switch controller could be replaced with diode.

18. The voltage regulator circuit for an RFID circuit of claim 1 wherein the impulse current source in the control circuit comprises a current mirror having a first mirror transistor and a second mirror transistor, wherein source terminals of the first mirror transistor and the second mirror transistor connecting together with the first input node, and gates of the first mirror transistor and the second mirror transistor connecting together with the mirror node, and a current source resetting transistor coupled the mirror node to ground.

19. The voltage regulator circuit for an RFID circuit of claim 18 wherein the mirror node is coupled to ground via the current source resetting transistor.

20. The voltage regulator circuit for an RFID circuit of claim 18 wherein the current source resetting transistor is driven by the second input node.

21. The voltage regulator circuit for an RFID circuit of claim 18 wherein drain of the first mirror transistor is connected to the mirror node.

22. The voltage regulator circuit for an RFID circuit of claim 18 further comprising a capacitor connecting the mirror node to ground.

23. The voltage regulator circuit for an RFID circuit of claim 1 wherein the blocking diode could be replaced with a diode-connected transistor.

24. The voltage regulator circuit for an RFID circuit of claim 1 wherein the output voltage adjusting component is either diode, diode-connected transistor, stacks of diodes, diode-connected transistor, resistor, or any combination thereof.

25. The voltage regulator circuit for an RFID circuit of claim 1 wherein the target value could be internally adjusted.

26. The voltage regulator circuit for an RFID circuit of claim 1 wherein the fourth switch is a transistor driven by one of the input nodes.

27. The voltage regulator circuit for an RFID circuit of claim 1 wherein the fifth switch is a transistor driven by the other one of the input nodes.

* * * * *